United States Patent [19]

Carlton

[11] Patent Number: 5,634,311

[45] Date of Patent: *Jun. 3, 1997

[54] DRAINAGE CONDUIT

[76] Inventor: Douglas C. Carlton, 1115 Heatherwood, Flint, Mich. 48532

[*] Notice: The term of this patent shall not extend beyond the expiration date of Pat. No. 5,560,163.

[21] Appl. No.: 198,515

[22] Filed: Feb. 18, 1994

[51] Int. Cl.[6] ...................................................... E04B 5/36
[52] U.S. Cl. ............................ 52/577; 52/220.8; 52/576; 52/699; 285/903
[58] Field of Search ............................ 52/699, 220.8, 52/576, 577; 285/903, 219, 221

[56] References Cited

U.S. PATENT DOCUMENTS

| | | | |
|---|---|---|---|
| 947,185 | 1/1910 | McBean | 285/219 X |
| 1,603,245 | 10/1926 | Pederson | 52/220.8 |
| 1,864,861 | 6/1932 | Schaller. | |
| 2,707,117 | 4/1955 | Fentress et al.. | |
| 2,758,612 | 8/1956 | Zaleski. | |
| 2,818,636 | 1/1958 | Fentress et al.. | |
| 2,893,431 | 7/1959 | Bowditch. | |
| 3,318,336 | 5/1967 | Treiber. | |
| 3,727,953 | 4/1973 | Martin et al. | 285/903 X |
| 3,895,177 | 7/1975 | Muslin. | |
| 4,071,265 | 1/1978 | Wallace | 52/220.8 X |
| 4,132,264 | 1/1979 | Furlong. | |
| 4,274,455 | 6/1981 | Simons. | |
| 4,488,388 | 12/1984 | Schmidt | 52/220.8 |
| 4,817,348 | 4/1989 | Wydra | 52/220.8 |
| 5,107,648 | 4/1992 | Roby | 52/699 X |

*Primary Examiner*—Christopher T. Kent
*Attorney, Agent, or Firm*—Weintraub, DuRoss & Brady

[57] ABSTRACT

A device for stabilizing footing drainage conduits while forming the footings including an annular disk and a cylindrical hub extending outwardly from and about the opening. A drain tile or conduit is engaged with the device about the hub while the device is secured to the footing form. The annular disk extends normal to the cylindrical hub. The device is adjusted to abut the form for the building footings. Accordingly, the devices are positioned and attached to the forms. The device provides support and prevents crushing of an end of the conduit when concrete is poured between the form boards when the footings are created. A nub on the cylindrical hub prevents lateral movement of the device when the footing forms are removed. An adjustable drainage tile can also be used. Two sections of conduit are employed for the adjustable drainage tile. One end of one of the sections of conduit has axially extending slits to allow interengagement of the end of the one section of conduit into the second conduit. The opposing devices can be moved laterally by adjusting the sections of conduit.

7 Claims, 2 Drawing Sheets

DRAINAGE CONDUIT

BACKGROUND OF THE INVENTION

I. Field of the Invention

The present invention relates in general to drainage conduits for buildings. More particularly, the present invention relates to an apparatus for stabilizing drainage conduits during building construction. Even more particularly, the present invention concerns means for stabilizing drainage conduits while constructing building footings.

II. Description of the Relevant Art

As is known to those skilled in the art to which the present invention pertains, there are methods and devices for draining moisture from the exterior of the building through the building footings to the interior of the building for removal by a sump pump or the like. One known method is to drill through the concrete after it has been poured and has hardened. This method is not desirable because it is expensive in time and material, particularly in wear on grinding tools.

Another known drainage method uses corrugated or drainage conduit that is located in the footing forms prior to pouring the cement. Typically, the ends of the conduits are nailed around their periphery to the footing forms. This is disadvantageous in that the conduit ends can be crushed by the nailing process and the weight of the concrete, thereby radially deforming and/or closing the drainage openings. Additionally, the corrugated conduit can be moved by the weight of the concrete away from the forms thereby allowing concrete into the interior of the corrugated conduit. The intrusion of concrete into the interior of the corrugated conduit reduces the benefit of the conduit for drainage purposes.

Further, the weight of the concrete can stretch the conduit and also remove the peripheries from their desired position.

It is thus seen that none of the above described methods or devices has the capability of preventing radial collapse of the conduit ends and impeding concrete material infiltration to the interior of the conduit.

SUMMARY OF THE INVENTION

The principal object of this invention is to provide a device which prevents radial collapse and crushing of the drainage conduit during formation of building or construction footings. According to the present invention, there is provided an apparatus or device for stabilizing drainage conduit during the forming of building footings comprising:

a disk having a central opening;

a cylindrical hub disposed about the opening and projecting outwardly from and substantially normal to the disk;

means for mounting an end of a conduit to the hub, and means for securing the device to a footing form.

The disk has a plurality of circumferentially disposed apertures through which nails or other means for fastening can be secured to a footing form or form board to attach the device thereto. Preferably, the conduit is threadably secured to the hub.

In use, a pair of opposed devices are secured to spaced apart form boards with the conduit spanning the gap therebetween.

When concrete is poured into the gap the devices prevent the ends of the conduit from being crushed and cement from entering the interior of the conduit.

For a more complete understanding of the present invention reference is made to the following detailed description and accompanying drawing. In the drawing, like reference characters refer to like parts throughout the several views in which:

DETAILED DESCRIPTION OF THE PREFERRED EMBODIMENT

Figure 2:
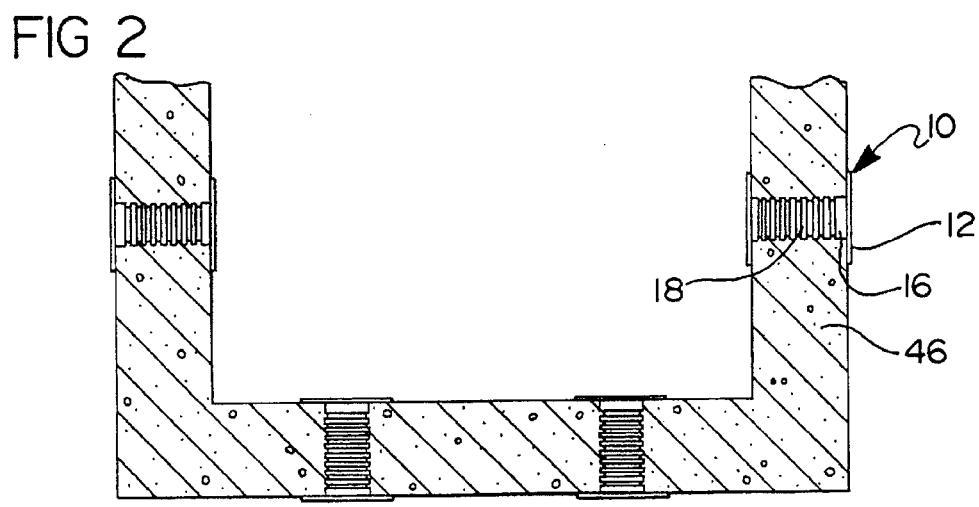
FIG. 2 is a sectional view of the conduit placed according to the invention.
Figure 1:
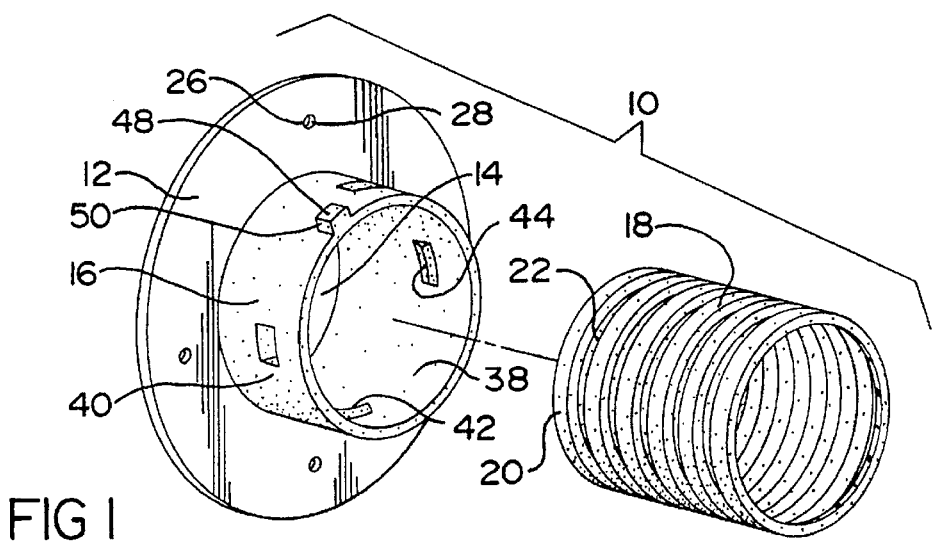
FIG. 1 is an exploded, perspective view of a first embodiment of the drainage conduit mounting device hereof.
Figure 3:
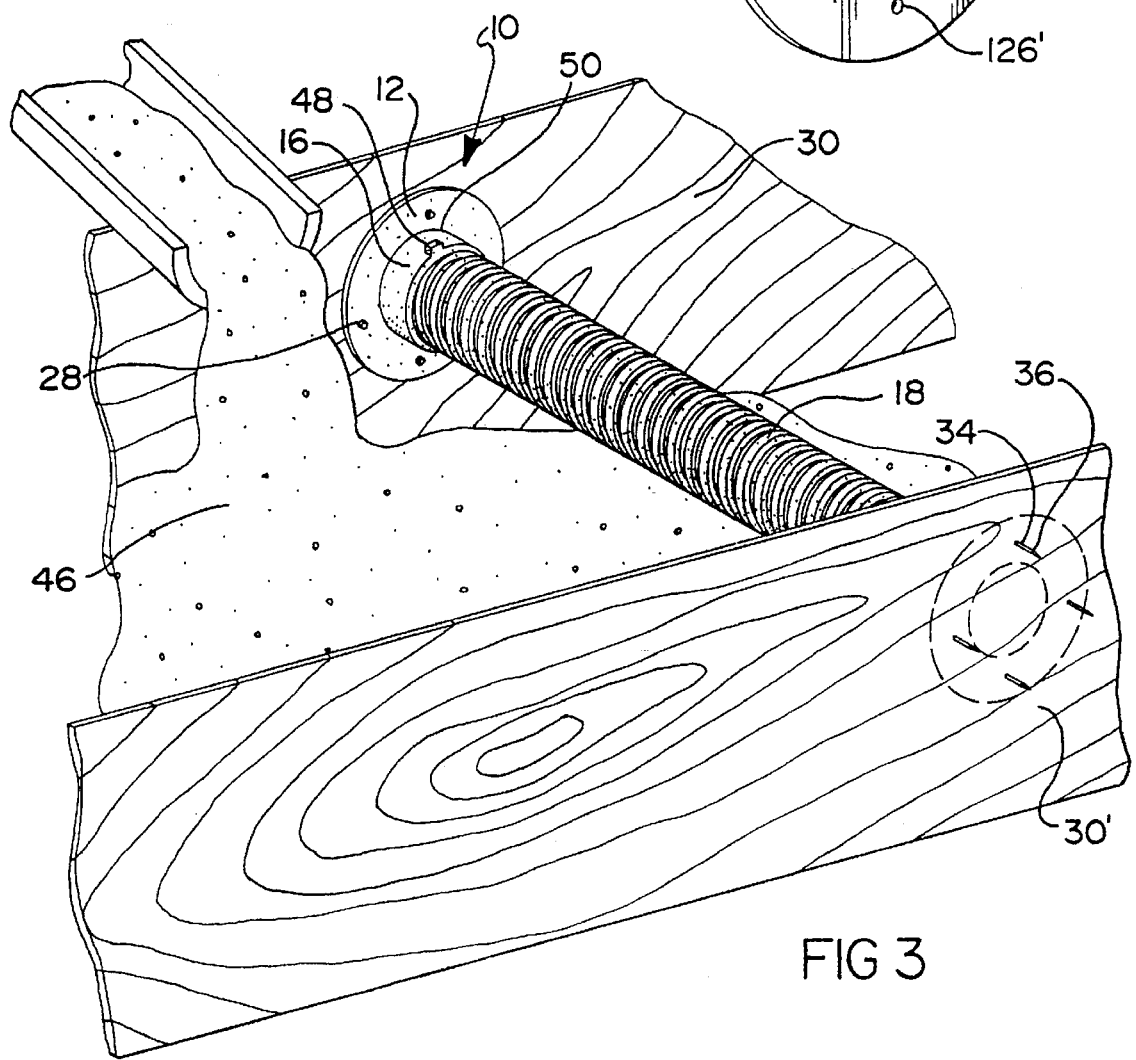
FIG. 3 is an environmental perspective view of the apparatus hereof during use.

With reference to the drawing and, in particular, FIGS. 1–3, there is depicted therein, a conduit mounting device, generally, denoted at 10. The device 10, is used to secure a drainage conduit or drain tile 18 to a footing form 30. In use, and as detailed subsequently, a pair of opposed mounting devices 10 are used to secure a conduit 18 therebetween during footing formation. The basic device 10, generally, comprises an annular or toroidal disk 12 having a central opening 14. A hub or cylinder portion 16 surrounds the opening 14 and extends normally from the disk 12, as shown.

The disk portion 12 includes means for securing or detachably connecting or temporarily fastening 26 for securing the device 10 to the form 30. The means 26, generally, comprises at least one aperture 28 through which means for fastening 34, such as a nail 36 is projected. In other words, a nail can be secured to the form 30 to, thus, secure the device 10 thereto.

However, other means for securing 26, such as screws, staples, adhesives, tacks, etc. (not shown) can be advantageously employed.

As shown in FIG. 1, the hub portion 16 has an interior surface 38 and an exterior surface 40. Means 42 for engaging the conduit 18 is disposed on the interior surface 38. The conduit enters the hub from the side opposite the annular disk. The means for engaging 42 comprises a plurality of protuberances 44 disposed on the interior surface 38 of the hub portion 24. The protuberances 44 project into the interior of the cylinder or hub 16. The protuberances 44 enable the conduit 18 to be attached to the device 10. In this regard, it is to be noted that the hub 16 has a diameter greater than that of the conduit 18. The corrugated drainage conduit 18 is of the type having annular transverse convolutions 20 disposed across its entire length. Interspersed on the corrugated drainage conduit 18 are valleys 22 therebetween the annular transverse convolutions 20.

By inserting an end of the conduit 18 into the interior of the hub 16, the conduit 18 can be threaded into the device 10 via the protuberances 44 which seat in the valleys 22. The hub portion 16 includes means for retaining 48 for retaining the device 10 in the footing 46. The means 48, generally, comprises at least one hub 50 extending outwardly from the exterior surface 40 of the hub portion 16.

However, other means for retaining 48, such as barbs, fingers, hooks, etc. (not shown) can be advantageously deployed herein.

The nub 60 provides greater surface area for the concrete material to form around. The nub 50 acts as a stop, thusly, preventing lateral dislodgment of the device 10 when the form 30 is removed.

It should be noted with respect hereto, although not shown and less preferred, that the hub may have a diameter less than that of the conduit and the protuberances project outwardly therefrom. The conduit can then be mounted onto the hub and the protuberances, through the pressure exerted on the conduit wall, hold the conduit in position. However, threading the conduit is preferred.

Figure 4:
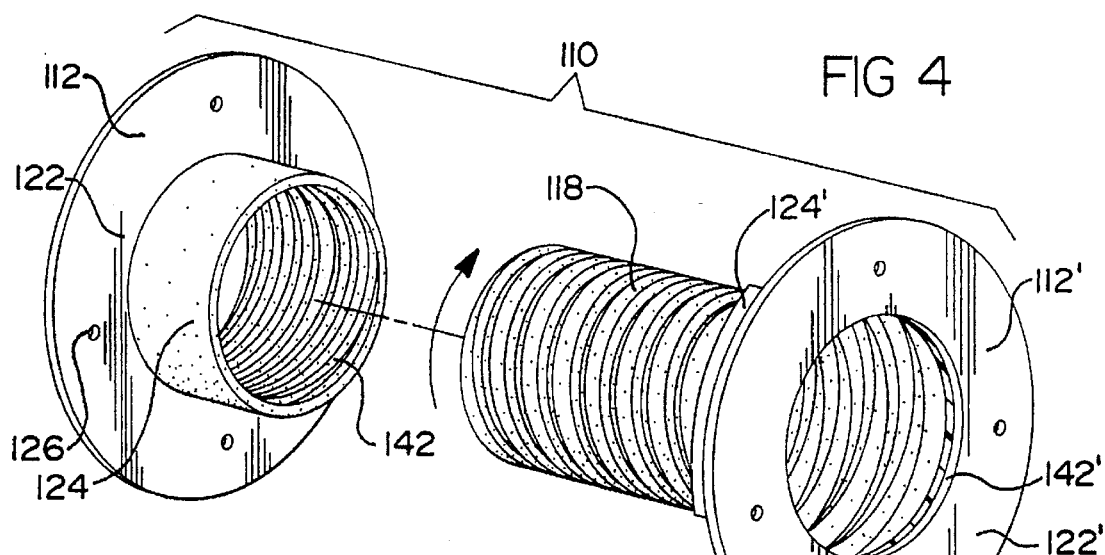
FIG. 4 is an exploded, perspective view of a second embodiment of the mounting apparatus hereof.

Now referring to FIG. 4 an alternate embodiment 110 of the invention is thereshown as a pair of opposed mounting devices 112, 112'. Each device 112 or 112' has a disk portion 122, 122' and a hub portion 124, 124'. Each disk portion 122, 122' has means for securing 126, 126' disposed thereon in a comparable manner to that described hereinabove. According to this embodiment a thread 142, 142' is formed in the interior of each hub 124, 124', as shown. The threads 142, 142' are complementary to the threads of the conduit 118 to enable the ends of the conduit to threadably engage each device 112, 112'.

Figure 5:
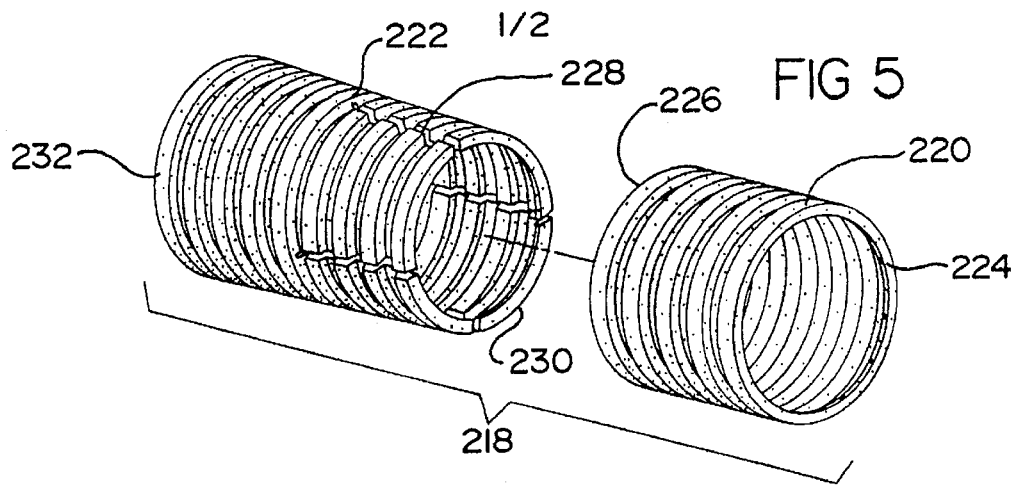
FIG. 5 is an exploded, perspective view of an embodiment of a conduit for use in the present invention.

In FIG. 5 there is depicted therein an alternate embodiment of a conduit 218. The conduit 218 comprises two separate sections 220 and 222 which are threadably interengagable to allow adjustment of the length of the conduit 118. The first section 220 of conduit 218 is of a regular diameter from one end 224 to the other end 226. The second section 222 of conduit 218 employs axially extending slits 228 extending from one end 230 of the second section 222 toward the other end 232. The axially extending slits 228 enable adjustability of the length of the conduit 218 to span the gap from one footing form board to another footing form board (not shown]. The axially extending slits 228 allow the end 230 of the second section 222 of conduit 218 to be compressed to fit inside the first section 220 of the conduit 218 and to be threadably interengaged therewith. The length of the conduit 218 can necessarily be adjusted to fit various widths of footings.

OPERATION

In use, and as shown in FIGS. 2 and 3, and as known to those skilled in the art, a building footing is traditionally formed by pouring concrete or cement 46 between a pair of spaced apart boards 30, 30', usually referred to as forms. In deploying the present invention, and as noted hereinabove, a pair of opposed devices are each, respectively, mounted to a board 30, 30' with the conduit 18 or 118 engaged therewith and spanning therebetween. The concrete 46 is poured around the conduit where it ultimately hardens. After hardening the board is removed. Here, the board is easily separated from the fastening means, thus leaving the devices in position (FIG. 2).

Thus, it is to be appreciated by those skilled in the art to which the invention pertains, that the present invention provides an apparatus or device which stabilizes drainage conduits during the formation of building footings, with no radial collapse or deformation of drain tile.

Having, thus, described the invention, what is claimed is:

1. A device for mounting drainage conduit to a building footing form, comprising:

an annular disk detachably connectable to the footing form and having a central opening;

a cylindrical hub projecting from the disk about the opening and being substantially normal thereto, the hub comprising means for receiving corrugated drainage conduit;

means for mounting the device to the form; and wherein the hub is adapted to receive an end of corrugated drainage conduit from a side opposite the annular disk.

2. The device of claim 1, wherein the annular disk comprises at least one aperture formed therein, the at least one aperture configured to receive means for temporarily fastening the device to a footing form.

3. The device of claim 1 which further comprises:

a plurality of protuberances formed on the hub and projecting into the interior of the hub, the hub configured to radially surround a corrugated drainage conduit.

4. The device of claim 1 further comprising:

means for retaining the device in position in a building footing.

5. The device of claim 4, wherein the means for retaining comprises a nub extending outwardly from the cylindrical hub.

6. In a device of the type adapted to be removably mounted to a footing form for precluding the deformation of drain tile emplaced in a building footing during formation thereof, the improvement comprising:

(i) an annular disk detachably connectable to the footing form and having a central opening;

(ii) a cylindrical hub projecting from the disk about the opening and being substantially normal thereto, the hub comprising means for receiving corrugated drainage conduit;

(iii) means for mounting the device to the form; and wherein the hub is adapted to receive an end of corrugated drainage conduit from a side opposite the annular disk.

7. The device of claim 5 wherein the annular disk comprises at least one aperture formed therein, the at least one aperture configured to receive means for temporarily fastening the device to a footing form.

* * * * *